US012620621B2

(12) United States Patent
Lee et al.

(10) Patent No.: US 12,620,621 B2
(45) **Date of Patent: *May 5, 2026**

(54) NON-AQUEOUS ELECTROLYTE FOR LITHIUM SECONDARY BATTERY AND LITHIUM SECONDARY BATTERY COMPRISING SAME

(71) Applicant: LG Energy Solution, Ltd., Seoul (KR)

(72) Inventors: Kyung Mi Lee, Daejeon (KR); Jung Min Lee, Daejeon (KR); Chul Eun Yeom, Daejeon (KR); Jung Gu Han, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 596 days.

This patent is subject to a terminal disclaimer.

(21) Appl. No.: 17/950,659

(22) Filed: Sep. 22, 2022

(65) Prior Publication Data

US 2023/0105288 A1 Apr. 6, 2023

(30) Foreign Application Priority Data

Oct. 5, 2021 (KR) ........................ 10-2021-0131937
Sep. 13, 2022 (KR) ........................ 10-2022-0115214

(51) Int. Cl.

| | |
|---|---|
| ***H01M 10/0567*** | (2010.01) |
| ***H01M 4/02*** | (2006.01) |
| ***H01M 4/505*** | (2010.01) |
| ***H01M 4/525*** | (2010.01) |
| ***H01M 10/052*** | (2010.01) |
| ***H01M 10/0525*** | (2010.01) |
| ***H01M 10/0568*** | (2010.01) |
| ***H01M 10/0569*** | (2010.01) |

(52) U.S. Cl.

CPC ... *H01M 10/0567* (2013.01); *H01M 10/0525* (2013.01); *H01M 2004/028* (2013.01); *H01M 4/505* (2013.01); *H01M 4/525* (2013.01); *H01M 10/0569* (2013.01); *H01M 2300/0025* (2013.01)

(58) Field of Classification Search

CPC ......... H01M 10/0567; H01M 10/0525; H01M 2300/0025

See application file for complete search history.

(56) References Cited

U.S. PATENT DOCUMENTS

| | | | |
|---|---|---|---|
| 2011/0045361 | A1 | 2/2011 | Abe et al. |
| 2018/0198157 | A1 | 7/2018 | Yu et al. |
| 2019/0334207 | A1 | 10/2019 | Yu et al. |
| 2020/0044287 | A1 | 2/2020 | Kim et al. |
| 2022/0115701 | A1 | 4/2022 | An et al. |
| 2023/0090340 | A1 | 3/2023 | Lee et al. |

FOREIGN PATENT DOCUMENTS

| | | | | | |
|---|---|---|---|---|---|
| CN | 102569889 | A | * | 7/2012 | |
| JP | H10050344 | A | | 2/1998 | |
| JP | 2000123867 | A | | 4/2000 | |
| JP | 3680454 | B2 | * | 8/2005 | |
| JP | 2007012507 | A | | 1/2007 | |
| JP | 2014013773 | A | | 1/2014 | |
| JP | 2024521798 | A | | 6/2024 | |
| KR | 20030061219 | A | | 7/2003 | |
| KR | 20170110521 | A | | 10/2017 | |
| KR | 20190008100 | A | | 1/2019 | |
| KR | 102103898 | B1 | | 4/2020 | |
| KR | 20200092889 | A | | 8/2020 | |
| KR | 20210060330 | A | | 5/2021 | |
| WO | WO-9804572 | A1 | * | 2/1998 | ........... C07D 311/16 |
| WO | WO-2021195524 | A1 | * | 9/2021 | ............ C01G 53/42 |
| WO | 2023014079 | A1 | | 2/2023 | |

OTHER PUBLICATIONS

Mi et al "Dual-target anti-Alzheimer's disease agents with both iron ion chelating and monoamine oxidase-B inhibitory activity" Aug. 16, 2019. JEMC, 34:1, 1489-1497. (Year: 2019).*
Translation of WO 9804572 A1 (Year: 1998).*
JP 3680454 B2 translation (Year: 2005).*
CN 102569889 A translation (Year: 2012).*

* cited by examiner

*Primary Examiner* — Jeffrey T Barton
*Assistant Examiner* — Gigi Lee Lin
(74) *Attorney, Agent, or Firm* — Lerner David LLP

(57) ABSTRACT

The present disclosure relates to a non-aqueous electrolyte for a lithium secondary battery, including a lithium salt, an organic solvent and a compound represented by Chemical Formula 1; and a lithium secondary battery including the same,

[Chemical Formula 1]

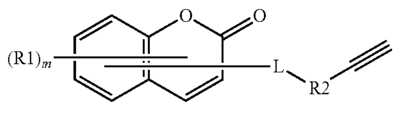

wherein R1, R2, L and m are described herein.

12 Claims, No Drawings

NON-AQUEOUS ELECTROLYTE FOR LITHIUM SECONDARY BATTERY AND LITHIUM SECONDARY BATTERY COMPRISING SAME

CROSS-REFERENCE TO RELATED APPLICATION

This application claims priority from Korean Patent Application No. 10-2021-0131937, filed on Oct. 5, 2021, and Korean Patent Application No. 10-2022-0115214, filed on Sep. 13, 2022, the disclosures of which are incorporated herein by reference.

BACKGROUND OF THE INVENTION

The present disclosure relates to a non-aqueous electrolyte for a lithium secondary battery and a lithium secondary battery including the same.

Lithium secondary batteries are generally manufactured by a method of forming an electrolyte assembly by interposing a separator between a positive electrode including a positive electrode active material comprising a transition metal oxide containing lithium and a negative electrode including a negative electrode active material capable of storing lithium ions, inserting the electrode assembly into a battery case, then injecting a non-aqueous electrolyte serving as a medium for transferring lithium ions, and then sealing the assembly.

Lithium secondary batteries can be miniaturized and have high energy density and a high operating voltage, and thus are applied to various fields such as mobile devices, electronic products, and electric vehicles. As the application fields of lithium secondary batteries have diversified, the required physical property conditions are also gradually increasing, and in particular, there is a need for developing a lithium secondary battery that can be stably driven under high voltage and high temperature conditions and has long life characteristics.

Meanwhile, when a lithium secondary battery is driven under high voltage and/or high temperature conditions, $PF_6^-$ anions may be thermally decomposed from lithium salts such as LiPF6 contained in an electrolyte to generate a Lewis acid such as $PF_5$, which reacts with moisture to produce HF. Such decomposition products such as $PF_5$ and HF can not only destroy a film formed on the surface of an electrode, but also cause a decomposition reaction of an organic solvent. Further, the electrolyte decomposition product may react with the decomposition products of a positive electrode active material to elute transition metal ions, and the eluted transition metal ions may be electrodeposited on a negative electrode to destroy a film formed on the surface of the negative electrode.

When an electrolyte decomposition reaction continues on the film thus destroyed, the performance of the battery further deteriorates, so there is a need for developing a secondary battery capable of maintaining excellent performance even under high voltage and high temperature conditions.

RELATED ART DOCUMENT

Patent Document

KR 10-2003-0061219 A

BRIEF SUMMARY OF THE INVENTION

The present invention has been made in an effort to solve the aforementioned problems, and is intended to provide a non-aqueous electrolyte capable of suppressing the decomposition reaction of an electrolyte and forming a reinforced film on the electrode by including a compound having a structure in which a propargyl group is bonded to coumarin, and a lithium secondary battery including the same.

According to an exemplary embodiment, the present disclosure provides a non-aqueous electrolyte for a lithium secondary battery, including: a lithium salt; an organic solvent; and a compound represented by the following Chemical Formula 1.

[Chemical Formula 1]

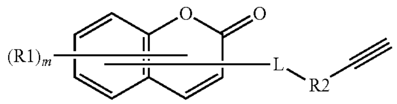

In Chemical Formula 1,

R1 is each independently an alkyl group having 1 to 10 carbon atoms,

R2 is an alkylene group having 1 to 10 carbon atoms,

L is a direct bond, —O—, —COO—, —RO—, or —R'COO—,

R and R' are each independently an alkylene group having 1 to 10 carbon atoms, and m is an integer from 0 to 5.

According to another exemplary embodiment, the present disclosure provides a lithium secondary battery including: a positive electrode including a positive electrode active material; a negative electrode including a negative electrode active material; a separator interposed between the positive electrode and the negative electrode; and the non-aqueous electrolyte for a lithium secondary battery.

DETAILED DESCRIPTION OF THE INVENTION

Hereinafter, the present invention will be described in more detail.

In general, anions included in lithium salts such as $LiPF_6$, which are widely used in an electrolyte for a lithium secondary battery, form decomposition products such as hydrogen fluoride (HF) and $PF_5$ by thermal decomposition, moisture, or the like. Such decomposition products have the properties of an acid and deteriorate a film or the surface of an electrode in a battery.

Transition metals in a positive electrode are easily eluted into an electrolyte due to the decomposition product of the electrolyte, the structural change of the positive electrode due to repeated charging and discharging, and the like, and the eluted transition metal is re-deposited to increase the resistance of the positive electrode. In addition, when the eluted transition metal moves to a negative electrode through the electrolyte, the eluted transition metal is electrodeposited on the negative electrode to cause the destruction of a solid electrolyte interphase (SEI) film and an additional electrolyte decomposition reaction, whereby a problem such as the consumption of lithium ions and an increase in resistance occurs.

Furthermore, a protective film is formed on the positive and negative electrodes by the electrolyte reaction during the initial activation of a battery, but when the film becomes unstable for the above reasons, additional decomposition of the electrolyte occurs during charging/discharging or exposure to high temperature, so the deterioration of the battery is promoted and gas is generated.

In particular, in the case of a battery including a positive electrode active material with a high nickel content, the initial capacity characteristics are improved, but when charging and discharging are repeated, lithium by-products and gas generation due to side reactions may increase, and the decomposition reaction of the electrolyte may be intensified.

In order to solve such a problem, the present inventors included a compound represented by the following Chemical Formula 1 having a structure in which a propargyl group is bonded to coumarin in a non-aqueous electrolyte, and found through this that the decomposition reaction of the electrolyte can be reduced and the elution of a transition metal and the generation of gas can be suppressed. In particular, it was confirmed that when the non-aqueous electrolyte according to the present disclosure is included, there is an effect of improving not only the initial capacity of a battery including a high-Ni positive electrode active material but also the durability with respect to high temperature storage and cycle progress.

Hereinafter, each configuration constituting the present disclosure will be described in more detail.

Non-Aqueous Electrolyte

The present disclosure provides a non-aqueous electrolyte for a lithium secondary battery, including: a lithium salt; an organic solvent; and a compound represented by Chemical Formula 1.

Hereinafter, each component will be specifically described.

(1) Compound Represented by Chemical Formula 1

The non-aqueous electrolyte includes a compound represented by the following Chemical Formula 1.

[Chemical Formula 1]

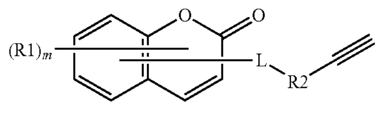

In Chemical Formula 1,

R1 is each independently an alkyl group having 1 to 10 carbon atoms,

R2 is an alkylene group having 1 to 10 carbon atoms,

L is a direct bond, —O—, —COO—, —RO—, or —R'COO—,

R and R' are each independently an alkylene group having 1 to 10 carbon atoms, and m is an integer from 0 to 5.

When a lithium secondary battery is continuously charged and discharged, active oxygen such as singlet oxygen and superoxide is generated at the positive electrode, which causes the performance of the battery to deteriorate. Since coumarin included in the compound represented by Chemical Formula 1 has higher reactivity with active oxygen than an electrolyte solvent such as ethylene carbonate, the decomposition of the electrolyte by active oxygen can be suppressed by coumarin reacting with active oxygen first compared to the electrolyte solvent. Further, since the compound represented by Chemical Formula 1 includes a propargyl functional group which is easily reduced, the compound may form a passivation film having enhanced durability while being reduced and decomposed on the surface of a negative electrode. That is, since a stable film can be formed at the interface between the positive electrode and the negative electrode and the electrolyte, stability may be secured by suppressing side reactions while using a high-Ni positive electrode active material, so it is effective for improving not only the initial performance of the lithium secondary battery, but also the high-temperature durability and long life thereof.

In an exemplary embodiment of the present disclosure, the compound represented by Chemical Formula 1 may comprise one or more selected from the group consisting of compounds represented by Chemical Formula 1-1 and Chemical Formula 2-1 below.

[Chemical Formula 1-1]

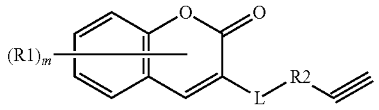

[Chemical Formula 2-1]

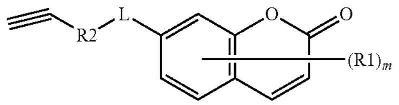

In Chemical Formula 1-1 and Chemical Formula 2-1,

R1, R2, L and m are the same as those defined in Chemical Formula 1.

Preferably, the compound represented by Chemical Formula 1 may be comprise the compound represented by Chemical Formula 1-1. When a propargyl group is substituted at position 3 as in Chemical Formula 1-1, it is desirable because there is an effect of increasing the reactivity by stabilizing the radicals at positions 3 and 4.

In an exemplary embodiment of the present disclosure, L of Chemical Formula 1 may be —O— or —COO—.

In an exemplary embodiment of the present disclosure, the compound represented by Chemical Formula 1 may comprise one or more selected from the group consisting of compounds represented by Chemical Formula 1-2, Chemical Formula 1-3, Chemical Formula 2-2 and Chemical Formula 2-3. Preferably, the compound represented by Chemical Formula 1 may comprise one or more selected from the group consisting of compounds represented by Chemical Formula 1-2 and Chemical Formula 1-3 below.

[Chemical Formula 1-2]

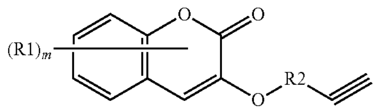

[Chemical Formula 1-3]

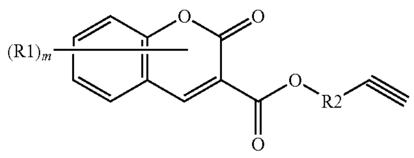

-continued

[Chemical Formula 2-2]

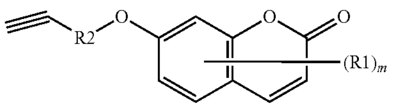

[Chemical Formula 2-3]

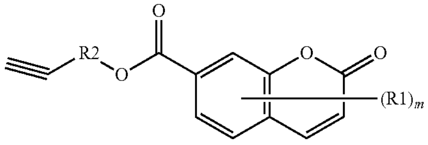

In Chemical Formula 1-2, Chemical Formula 1-3, Chemical Formula 2-1 and Chemical Formula 2-3, wherein R1, R2 and m are the same as those defined in Chemical Formula 1.

In an exemplary embodiment of the present disclosure, m of Chemical Formula 1 may be 0, and R2 may be an alkylene group having 1 to 5 carbon atoms, preferably an alkylene group having 1 to 3 carbon atoms, and more preferably a methylene group.

In an exemplary embodiment of the present disclosure, the compound represented by Chemical Formula 1 may comprise one or more selected from the group consisting of compounds represented by Chemical Formula 1A, Chemical Formula 1B, Chemical Formula 2A and Chemical Formula 2B below. Preferably, the compound represented by Chemical Formula 1 may comprise one or more selected from the group consisting of compounds represented by Chemical Formula 1A and Chemical Formula 1B below.

[Chemical Formula 1A]

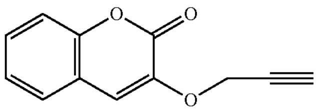

[Chemical Formula 1B]

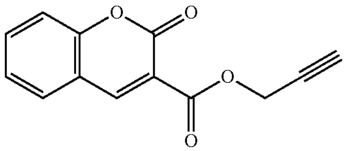

[Chemical Formula 2A]

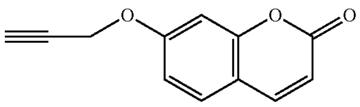

[Chemical Formula 2B]

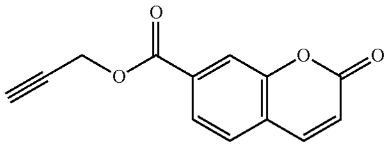

In an exemplary embodiment of the present disclosure, the content of the compound represented by Chemical Formula 1 may be 0.1 wt % to 5 wt %, preferably 0.1 wt % to 1 wt %, and more preferably 0.2 wt % to 0.8 wt %, based on the total weight of the non-aqueous electrolyte.

When the content of the compound represented by Chemical Formula 1 is 0.1 wt % or more, it is preferable in that it is possible to obtain an effect of suppressing the decomposition of metal ions in a positive electrode to be obtained in the present disclosure, and when the content is 5 wt % or less, it is preferable because it is possible to prevent the performance of the battery from deteriorating due to an increase in resistance.

(2) Additives

The non-aqueous electrolyte of the present disclosure may selectively further include the following additives, as necessary, in order to prevent the induction of collapse of an electrode due to the decomposition of the electrolyte in a high voltage environment, or to further improve low-temperature high-rate discharge characteristics, high temperature stability, the prevention of overcharge, a battery expansion suppression effect at high temperature, and the like.

The additive may be one or more selected from a cyclic carbonate-based compound, a halogen-substituted carbonate-based compound, a sultone-based compound, a sulfate-based compound, a phosphate-based or phosphite-based compound, a borate-based compound, a nitrile-based compound, an amine-based compound, a silane-based compound, a benzene-based compound or a lithium salt-based compound.

The cyclic carbonate-based compound may be one or more selected from vinylene carbonate (VC) or vinyl ethylene carbonate (VEC), and may be specifically vinylene carbonate.

The halogen-substituted carbonate-based compound may be fluoroethylene carbonate (FEC).

The sultone-based compound is a material capable of forming a stable SEI film by a reduction reaction on the surface of the negative electrode, may be 1,3-propane sultone (PS), 1,4-butane sultone, ethene sultone, 1,3-propene sultone (PRS), 1,4-butane sultone or 1-methyl-1,3-propene sultone, and may be specifically 1,3-propane sultone (PS).

The sulfate-based compound is a material that can be electrically decomposed on the surface of the negative electrode to form a stable SEI film that does not crack even during high-temperature storage, and may be one or more selected from ethylene sulfate (Esa), trimethylene sulfate (TMS), or methyl trimethylene sulfate (MTMS).

The phosphate-based or phosphite-based compound may be one or more selected from lithium difluoro (bisoxalato) phosphate, lithium difluorophosphate, tris(trimethylsilyl) phosphate, tris(trimethylsilyl)phosphite, tris(2,2,2-trifluoroethyl)phosphate, or tris(trifluoroethyl)phosphite.

The borate-based compound may be lithium tetraphenylborate.

The nitrile-based compound may be one or more selected from succinonitrile (SN), adiponitrile (ADN), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, ethylene glycol bis(2-cyanoethyl)ether (ASA3), 1,3,6-hexanetricarbonitrile (HTCN), 1,4-dicyano 2-butene (DCB) or 1,2,3-tris(2-cyanoethyl)propane (TCEP).

The amine-based compound may be one or more selected from triethanolamine or ethylenediamine, and the silane-based compound may be tetravinylsilane.

The benzene-based compound may be one or more selected from monofluorobenzene, difluorobenzene, trifluorobenzene or tetrafluorobenzene.

The lithium salt-based compound is a compound different from the lithium salt included in the non-aqueous electrolyte, and may be lithium difluorophosphate (LiDFP; $LiPO_2F_2$), lithium bis(oxalato)borate (LiBOB; $LiB(C_2O_4)_2$), lithium tetrafluoroborate ($LiBF_4$) or lithium difluoro(bisoxalato)phosphate (LiDFOP).

Preferably, the non-aqueous electrolyte according to an exemplary embodiment of the present disclosure may further include one or more additives selected from vinylene carbonate (VC), vinyl ethylene carbonate (VEC), vinyl ethylene carbonate (FEC), 1,3-propane sultone (PS), 1,3-propene sultone (PRS), ethylene sulfate (ESa), succinonitrile (SN), adiponitrile (ADN), ethylene glycol bis(2-cyanoethyl)ether (ASA3), 1,3,6-hexanetricarbonitrile (HTCN), 1,4-dicyano 2-butene (DCB), 1,2,3-tris(2-cyanoethyl)propane (TCEP), lithium difluoro oxalato borate (LiODFB), lithium tetrafluoroborate ($LiBF_4$), lithium difluoro(bisoxalato)phosphate (LiDFOP) or lithium difluorophosphate (LiDFP).

More preferably, the non-aqueous electrolyte according to an exemplary embodiment of the present disclosure may further include one or more additives selected from vinylene carbonate (VC), vinyl ethylene carbonate (VEC), 1,3-propane sultone (PS), ethylene sulfate (ESa), lithium difluoro oxalato borate (LiODFB), or lithium difluorophosphate (LiDFP).

Meanwhile, the content of the additive may be 0.1 wt % to 10 wt %, preferably 0.3 wt % to 5 wt %, based on the total weight of the non-aqueous electrolyte. When the content of the additive is within the above range, there is an effect of suppressing side reactions through film formation on the positive electrode and the negative electrode.

(3) Organic solvent

The non-aqueous electrolyte of the present disclosure includes an organic solvent.

As the organic solvent, various organic solvents typically used in a lithium electrolyte may be used without limitation. For example, the organic solvent may be a cyclic carbonate-based solvent, a linear carbonate-based solvent, a linear ester-based solvent, a cyclic ester-based solvent, a nitrile-based solvent or a mixture thereof, and may preferably include a mixture of a cyclic carbonate-based solvent and a linear carbonate-based solvent.

The cyclic carbonate-based solvent is a high-viscosity organic solvent and has a high dielectric constant, and thus can dissociate the lithium salt in the electrolyte well, and may be one or more selected from the group consisting of ethylene carbonate (EC), propylene carbonate (PC), 1,2-butylene carbonate, 2,3-butylene carbonate, 1,2-pentylene carbonate, 2,3-pentylene carbonate and vinylene carbonate, and may preferably include ethylene carbonate (EC) or propylene carbonate (PC).

Further, the linear carbonate-based solvent is an organic solvent having low viscosity and a low dielectric constant, and may be one or more selected from the group consisting of dimethyl carbonate (DMC), diethyl carbonate (DEC), dipropyl carbonate, ethyl methyl carbonate (EMC), methyl propyl carbonate and ethyl propyl carbonate, and may preferably include ethyl methyl carbonate (EMC), dimethyl carbonate (DMC), or diethyl carbonate (DEC).

The organic solvent is preferably a mixture of a cyclic carbonate-based solvent and a linear carbonate-based solvent in order to prepare an electrolyte having high ionic conductivity.

The linear ester-based solvent may be one or more selected from methyl acetate, ethyl acetate, propyl acetate, methyl propionate, ethyl propionate, propyl propionate or butyl propionate, and may be preferably methyl propionate, ethyl propionate or propyl propionate.

The cyclic ester-based solvent may be one or more selected from γ-butyrolactone, γ-valerolactone, γ-caprolactone, σ-valerolactone or ε-caprolactone.

The nitrile-based solvent may be one or more selected from succinonitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, or 4-fluorophenylacetonitrile, and may be preferably succinonitrile.

In the total weight of the non-aqueous electrolyte, excluding all components other than the organic solvent, for example, the amount of the compound represented by Chemical Formula 1, additives, and the lithium salt, the remainder may be an organic solvent unless otherwise specified.

(4) Lithium Salt

The non-aqueous electrolyte of the present disclosure includes a lithium salt.

As the lithium salt, those typically used in an electrolyte for a lithium secondary battery may be used without limitation, and specifically, the lithium salt includes $Li^+$ as a cation, and may include any one or more selected from $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $BF_2C_2O_4CHF$—, $PF_4C_2O_4^-$, $PF_2C_4O_8^-$, $PO_2F_2^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$ or $SCN^-$ as an anion.

Specifically, the lithium salt may be one or more selected from $LiPF_6$, $LiCLO_4$, $LiBF_4$, $LiN(FSO_2)_2$(LiFSI), $LiN(SO_2CF_3)_2$(LiTFSI), lithium bis(pentafluoroethanesulfonyl) imide (LiBETI), $LiSO_3CF_3$, $LiPO_2F_2$, lithium bis(oxalate) borate (LiBOB), lithium difluoro(oxalate)borate (LiFOB), lithium difluoro(bisoxalato) phosphate (LiDFOP), lithium tetrafluoro(oxalate) phosphate (LiTFOP), or lithium fluoromalonato(difluoro) borate (LiFMDFB), and may be preferably $LiPF_6$.

In an exemplary embodiment of the present disclosure, the concentration of the lithium salt in the non-aqueous organic solution including the lithium salt and the organic solvent may be 0.5 to 4.0 M, specifically 0.5 M to 3.0 M, and more specifically 0.8 M to 2.0 M. When the concentration of the lithium salt is within the above range, it is possible to obtain an appropriate electrolyte impregnation property by preventing the viscosity and surface tension from becoming excessively high while sufficiently securing the effects of improving low temperature output and cycle characteristics.

Lithium Secondary Battery

Next, a lithium secondary battery according to the present disclosure will be described.

The lithium secondary battery according to the present disclosure includes a positive electrode including a positive electrode active material, a negative electrode including a negative electrode active material, a separator interposed between the positive electrode and the negative electrode, and a non-aqueous electrolyte, and in this case, the non-aqueous electrolyte is the non-aqueous electrolyte according to the present disclosure. Since the non-aqueous electrolyte has been described in detail, the description thereof will be omitted, and other constituent elements will be described below.

(1) Positive Electrode

A positive electrode according to the present disclosure includes a positive electrode active material, and may be manufactured by coating a positive electrode current collector with a positive electrode slurry including a positive electrode active material, a binder, a conductive material, a solvent, and the like, and then drying and rolling the resultant.

The positive electrode current collector is not particularly limited as long as the collector has conductivity without causing a chemical change to the battery, and for example, it is possible to use stainless steel; aluminum; nickel; titanium; calcined carbon, or aluminum or stainless steel surface-treated with carbon, nickel, titanium, silver, and the like.

The positive electrode active material is a compound enabling reversible intercalation and deintercalation of lithium, and specifically, the positive electrode active material may include a lithium composite metal oxide including lithium and one or more metals such as cobalt, manganese, nickel or aluminum.

More specifically, the positive electrode active material may include one or more of a lithium-cobalt-based oxide (for example, $LiCoO_2$, and the like), a lithium-manganese-based oxide (for example, $LiMnO_2$, $LiMn_2O_4$, and the like), a lithium-nickel-based oxide (for example, $LiNiO_2$, and the like), a lithium-nickel-manganese-based oxide (for example, $LiNi_{1-Y}Mn_YO_2$ (here, $0<Y<1$), $LiMn_{2-z}Ni_zO_4$ (here, $0<Z<2$), and the like), a lithium-nickel-cobalt-based oxide (for example, $LiNi_{1-Y1}Co_{Y1}O_2$ (here, $0<Y1<1$), and the like), a lithium-manganese-cobalt-based oxide (for example, $LiCo_{1-Y2}Mn_{Y2}O_2$ (here, $0<Y2<1$), $LiMn_{2-z1}Co_{z1}O_4$ (here, $0<Z1<2$), and the like), a lithium-nickel-manganese-cobalt-based oxide (for example, $Li(Ni_pCo_qMn_{r1})O_2$ (here, $0<p<1$, $0<q<1$, $0<r1<1$, $p+q+r1=1$), $Li(Ni_{p1}Co_{q1}Mn_{r2})O_4$ (here, $0<p1<2$, $0<q1<2$, $0<r2<2$, $p1+q1+r2=2$), and the like), and a lithium-nickel-cobalt-transition metal (M) oxide (for example, $Li(Ni_{p2}Co_{q2}Mn_{r3}M_{S2})O_2$ (here, M is selected from the group consisting of Al, Fe, V, Cr, Ti, Ta, Mg, Ti and Mo, p2, q2, r3, and s2 each are an atomic fraction of an independent element, and $0<p2<1$, $0<q2<1$, $0<r3<1$, $0<s2<1$, and $p2+q2+r3+s2=1$)). Among them, in terms of improving capacity characteristics and stability of the battery, the positive electrode active material may include at least one selected from the group consisting of a lithium-cobalt oxide, a lithium-manganese-based oxide, a lithium-nickel-manganese-cobalt-based oxide and a lithium-nickel-cobalt-transition metal (M) oxide, and may include at least one selected from a lithium-nickel-manganese-cobalt-based oxide with a nickel content of 55 atm % or more or a lithium-nickel-cobalt-transition metal (M) oxide with a nickel content of 55 at % or more.

Representative examples thereof include at least one selected from the group consisting of $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$ and $Li(Ni_{0.86}Co_{0.05}Mn_{0.07}Al_{0.02})O_2$, and may preferably include $Li(Ni_{0.86}Co_{0.07}Mn_{0.07}Al_{0.02})O_2$.

Further, the positive electrode active material according to an exemplary embodiment of the present disclosure may include a lithium composite transition metal oxide represented by the following Chemical Formula 3.

$$Li_{1+x}(Ni_aCo_bMn_cM_d)O_2 \quad \text{[Chemical Formula 3]}$$

In Chemical Formula 3,

M is one or more selected from W, Cu, Fe, V, Cr, Ti, Zr, Zn, Al, In, Ta, Y, La, Sr, Ga, Sc, Gd, Sm, Ca, Ce, Nb, Mg, B or Mo, 1+x, a, b, c and d each are an atomic fraction of an independent element, more specifically an atomic fraction of Li, Ni, Co, Mn and M, respectively, and $0\leq x\leq 0.2$, $0.50\leq a<1$, $0<b\leq 0.25$, $0<c\leq 0.25$, $0\leq d\leq 0.1$, and $a+b+c+d=1$.

Preferably, a, b, c and d may each be $0.70\leq a\leq 0.95$, $0.025\leq b\leq 0.20$, $0.025\leq c\leq 0.20$, and $0\leq d\leq 0.05$.

Further, a, b, c and d may each be $0.80\leq a\leq 0.95$, $0.025\leq b\leq 0.15$, $0.025\leq c\leq 0.15$, and $0\leq d\leq 0.05$.

In addition, a, b, c and d may each be $0.85\leq a\leq 0.90$, $0.05\leq b\leq 0.10$, $0.05\leq c\leq 0.10$, and $0\leq d\leq 0.03$.

The positive electrode active material may be included in an amount of 80 wt % to 99 wt %, specifically 90 wt % to 99 wt % based on the total weight of the solid content in the positive electrode slurry. In this case, when the content of the positive electrode active material is 80 wt % or less, energy density is reduced, and thus capacity may be lowered.

The binder is a component that assists in the binding between the active material and the conductive material, and the like and the binding to the current collector and may be typically added at a content of 1 wt % to 30 wt % based on the total weight of the solid content in the positive electrode slurry. An example of such a binder may be polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluororubber, or various copolymers thereof.

Furthermore, the conductive material is a material that imparts conductivity without causing a chemical change to the battery, and may be added in an amount of 0.5 wt % to 20 wt % based on the total weight of the solid content in the positive electrode slurry.

The conductive material may be selected from, for example, carbon black such as acetylene black, Ketjen black, channel black, furnace black, lamp black and thermal black; graphite powder such as natural graphite, artificial graphite, carbon nanotubes and graphite; conductive fibers such as carbon fibers and metal fibers; conductive powders such as carbon fluoride powder, aluminum powder and nickel powder; conductive whiskers such as zinc oxide and potassium titanate; conductive metal oxides such as titanium oxide; and conductive materials such as polyphenylene derivatives.

Further, the solvent of the positive electrode slurry may include an organic solvent such as N-methyl-2-pyrrolidone (NMP), and may be used in an amount to obtain a preferred viscosity when including the positive electrode active material, a binder, a conductive material, and the like. For example, the solvent may be included such that the concentration of the solid content in the positive electrode slurry including the positive electrode active material, the binder, and the conductive material is 40 wt % to 90 wt %, preferably 50 wt % to 80 wt %.

(2) Negative Electrode

A negative electrode according to the present disclosure includes a negative electrode active material, and may be manufactured by coating a negative electrode current collector with a negative electrode slurry including a negative electrode active material, a binder, a conductive material, a solvent, and the like, and then drying and rolling the resultant.

The negative electrode current collector generally has a thickness of 3 μm to 500 μm. The negative electrode current collector is not particularly limited as long as the negative electrode current collector has high conductivity without causing a chemical change to the battery, and for example, it is possible to use copper; stainless steel; aluminum; nickel; titanium; calcined carbon; copper or stainless steel surface-treated with carbon, nickel, titanium, silver, and the like; an aluminum-cadmium alloy, and the like. In addition, similar to the positive electrode collector, the adhesion of a negative electrode active material may also be increased by forming fine irregularities on a surface of the negative electrode collector and the collector may be used in various forms such as a film, a sheet, a foil, a net, a porous body, a foaming body, and a nonwoven body.

Furthermore, the negative electrode active material may include a carbon material capable of reversibly intercalating/deintercalating lithium ions; metals or alloys of these metals and lithium; metal composite oxides; a material capable of doping and dedoping lithium; lithium metal; and one or more selected from transition metal oxides.

As the carbon material capable of reversibly intercalating/deintercalating lithium ions, any carbon-based negative electrode active material generally used in lithium ion secondary batteries may be used without particular limitation, and as a representative example thereof, crystalline carbon, amorphous carbon or a combination thereof may be used. Examples of the crystalline carbon include graphite such as amorphous, plate, flake, spherical or fibrous natural graphite or artificial graphite, and examples of the amorphous carbon include soft carbon (low temperature calcined carbon), hard carbon, mesophase pitch carbide, fired coke, and the like.

As the metals or alloys of these metals and lithium, a metal selected from the group consisting of Cu, Ni, Na, K, Rb, Cs, Fr, Be, Mg, Ca, Sr, Si, Sb, Pb, In, Zn, Ba, Ra, Ge, Al and Sn or an alloy of these metals and lithium may be used.

As the metal composite oxide, it is possible to use one or more selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group 1, Group 2 and Group 3 elements of the Periodic Table, and a halogen; $0<x\leq 1$; $1\leq y\leq 3$; and $1\leq z\leq 8$).

Examples of the material capable of doping and dedoping lithium include Si, $SiO_x$ ($0<x<2$), a Si—Y alloy (Y is an element selected from the group consisting of alkali metals, alkaline earth metals, Group 13 elements, Group 14 elements, transition metals, rare earth elements and combinations thereof, and is not Si), Sn, $SnO_2$, Sn—Y (Y is an element selected from the group consisting of alkali metals, alkaline earth metals, Group 13 elements, Group 14 elements, transition metals, rare earth elements and combinations thereof, and is not Sn) and the like, and at least one of them and $SiO_2$ may also be mixed and used. The element Y may be selected from the group consisting of Mg, Ca, Sr, Ba, Ra, Sc, Y, Ti, Zr, Hf, Rf, V, Nb, Ta, dubnium (Db), Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po and a combination thereof.

Examples of the transition metal oxide include a lithium-containing titanium composite oxide (LTO), vanadium oxide, lithium vanadium oxide, and the like.

The negative electrode active material may be included in an amount of 80 wt % to 99 wt % based on the total weight of the solid content in the negative electrode slurry.

The binder is a component that assists in bonding between the conductive material, the active material, and the current collector, and may typically be added in an amount of 1 wt % to 30 wt % based on the total weight of the solid content in the negative electrode slurry. Examples of such a binder include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluororubber, various copolymers thereof, or the like.

The conductive material is a component for further improving the conductivity of the negative electrode active material, and may be added in an amount of 0.5 wt % to 20 wt % based on the total weight of the solid content in the negative electrode slurry. Such a conductive material is not particularly limited as long as it has conductivity without causing a chemical change to the battery, and it is possible to use, for example, carbon black such as acetylene black, Ketjen black, channel black, furnace black, lamp black and thermal black; graphite powder such as natural graphite with a highly developed crystal structure, artificial graphite, carbon nanotubes and graphite; conductive fibers such as carbon fibers and metal fibers; conductive powders such as carbon fluoride powder, aluminum powder and nickel powder; conductive whiskers such as zinc oxide and potassium titanate; conductive metal oxides such as titanium oxide; conductive materials such as polyphenylene derivatives, or the like.

The solvent of the negative electrode slurry may include water; or an organic solvent such as NMP and an alcohol, and may be used in an amount to obtain a preferred viscosity when including the negative electrode active material, the binder, the conductive material, and the like. For example, the solvent may be included such that the concentration of the solid content in the slurry including the negative electrode active material, the binder, and the conductive material is 30 wt % to 80 wt %, preferably 40 wt % to 70 wt %.

(3) Separator

The lithium secondary battery according to the present disclosure includes a separator between the positive electrode and the negative electrode.

The separator separates the negative electrode and the positive electrode and provides a passage for lithium ions to move, and may be used without any particular limitation as long as the separator is typically used as a separator in a secondary battery, and in particular, a separator having an excellent electrolyte impregnation ability as well as low resistance to ion movement in the electrolyte and excellent stability is preferable.

Specifically, as a separator, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator including a ceramic component or a polymeric material may be used to secure heat resistance or mechanical strength and may be used in a single-layered or multi-layered structure.

The lithium secondary battery according to the present disclosure as described above may be usefully used for the fields of portable devices such as mobile phones, notebook-sized computers, and digital cameras and electric vehicles such as hybrid electric vehicles (HEVs).

Accordingly, according to another exemplary embodiment of the present disclosure, provided are a battery module including the lithium secondary battery as a unit cell, and a battery pack including the same.

The battery module or battery pack may be used as a power source for a power tool; an electric vehicle including an electric vehicle (EV), a hybrid electric vehicle and a plug-in hybrid electric vehicle (PHEV); and one or more medium and large devices of a power storage system.

The external shape of the lithium secondary battery of the present disclosure is not particularly limited, but may be a cylindrical type using a can, a prismatic type, a pouch type, or a coin type.

The lithium secondary battery according to the present disclosure may not only be used for a battery cell used as a power source for a small device, but also preferably as a unit battery for a medium and large battery module including a plurality of battery cells.

Hereinafter, the present disclosure will be described in detail through specific Examples.

EXAMPLES

Example 1

Preparation of Non-Aqueous Electrolyte

After ethylene carbonate (EC) and ethyl methyl carbonate (EMC) were mixed at a volume ratio of 30:70, $LiPF_6$ was dissolved to 1.0 M to prepare a non-aqueous organic solution. 100 wt % of a non-aqueous electrolyte was prepared by mixing 0.5 wt % of the compound represented by Chemical Formula 1A (Cas No. 119827-21-3), 0.5 wt % of vinylene carbonate (VC), 0.5 wt % of 1,3-propane sultone (PS) and the remainder as the non-aqueous organic solution.

Manufacture of Lithium Secondary Battery

A positive electrode mixture slurry (75.5 wt % solid content) was prepared by adding a positive electrode active material ($LiNi_{0.85}Co_{0.05}Mn_{0.07}Al_{0.03}O_2$), a conductive material (carbon nanotubes) and a binder (polyvinylidene fluoride) at a weight ratio of 98.0:0.7:1.3 to N-methyl-2-pyrrolidone (NMP) which is a solvent. A positive electrode was manufactured by applying the positive electrode mixture slurry to one surface of a positive electrode current collector having a thickness of 12 μm and drying and roll-pressing the resultant.

A negative electrode mixture slurry (50 wt % solid content) was prepared by adding a negative electrode active material (artificial graphite), a conductive material (carbon black) and a binder (styrene-butadiene rubber) at a weight ratio of 96.5:1.5:2.0 to distilled water which is a solvent. A negative electrode was manufactured by applying the negative electrode mixture slurry to one surface of a negative electrode current collector (Cu thin film) having a thickness of 8 μm and drying and roll-pressing the resultant.

After a polyethylene porous film separator was interposed between the positive electrode and the negative electrode prepared above in a dry room, a secondary battery was manufactured by injecting the prepared non-aqueous electrolyte.

Example 2

A lithium secondary battery was manufactured in the same manner as in Example 1, except that the compound represented by Chemical Formula 1B (Cas No. 71387-23-0) was used instead of the compound represented by Chemical Formula 1A during the preparation of the non-aqueous electrolyte.

Example 3

A lithium secondary battery was manufactured in the same manner as in Example 1, except that VC and PS were not added during the preparation of the non-aqueous electrolyte.

Example 4

A lithium secondary battery was manufactured in the same manner as in Example 1, except that $LiCoO_2$ was used instead of $LiNi_{0.85}Co_{0.05}Mn_{0.07}Al_{0.03}O_2$ as a positive electrode active material during the manufacture of the positive electrode.

Example 5

A lithium secondary battery was manufactured in the same manner as in Example 1, except that the compound represented by Chemical Formula 2A was used instead of the compound represented by Chemical Formula 1A (Cas No. 119827-21-3) during the preparation of the non-aqueous electrolyte.

Example 6

A lithium secondary battery was manufactured in the same manner as in Example 2, except that the compound represented by Chemical Formula 2B was used instead of the compound represented by Chemical Formula 1B (Cas No. 71387-23-0) during the preparation of the non-aqueous electrolyte.

Comparative Example 1

A lithium secondary battery was manufactured in the same manner as in Example 1, except that the compound represented by Chemical Formula 1A was not added during the preparation of the non-aqueous electrolyte.

Comparative Example 2

A lithium secondary battery was manufactured in the same manner as in Example 1, except that coumarin was used instead of the compound represented by Chemical Formula 1A during the preparation of the non-aqueous electrolyte.

Comparative Example 3

A lithium secondary battery was manufactured in the same manner as in Comparative Example 2, except that VC and PS were not added during the preparation of the non-aqueous electrolyte.

Comparative Example 4

A lithium secondary battery was manufactured in the same manner as in Comparative Example 1, except that $LiCoO_2$ was used instead of $LiNi_{0.85}Co_{0.05}Mn_{0.07}Al_{0.03}O_2$ as a positive electrode active material during the manufacture of the positive electrode.

Experimental Example 1. Evaluation of High Temperature Life

After each of the lithium secondary batteries manufactured in the Examples and Comparative Examples was subjected to a formation process at 0.2 C rate at 25° C., the gas in the battery was removed through a degassing process. The lithium secondary battery from which gas had been removed was charged with constant current/constant voltage (CC/CV) to 4.2 V at 0.33 C rate at a temperature of 45° C. and then 0.05 C cut off charging was performed and constant current (CC) discharging was performed to 2.5 V at 0.33 C rate.

1 cycle was set as performing the above charging/discharging once, and the results of measuring the discharge capacity in the initial state (1 cycle) are shown in the following Table 1 as an initial capacity. After the same charging/discharging was repeated 200 times, the discharge capacity was measured, a retention rate compared to the initial capacity was calculated, and is shown as a capacity retention rate in the following Table 1.

Experimental Example 2. Evaluation of High Temperature Storage

After each of the lithium secondary batteries manufactured in the Examples and Comparative Examples was subjected to a formation process at 0.2 C rate at 25° C., the gas in the battery was removed through a degassing process. Thereafter, the lithium secondary battery was charged under constant current/constant voltage conditions to 4.2 V at 0.33 C rate at room temperature (25° C.) and subjected to 0.05 C cut off charging and discharged at 0.33 C to 2.5 V. In this case, the measured discharge capacity is described as an initial capacity in the following Table 1.

Thereafter, after the lithium secondary battery was stored at 60° C. for 4 weeks, the lithium secondary battery was transferred to a charger and discharger at room temperature (25° C.), and then charged under constant current/constant voltage conditions to 4.2 V at 0.33 C rate and subjected to 0.05 C cut off charging and discharged at 0.33 C to 2.5 V. The discharge capacity and retention rate compared to the initial capacity measured in this case are shown in the following Table 1.

TABLE 1

| | Electrolyte | | | Experimental Example 1 | | | Experimental Example 2 | | |
|---|---|---|---|---|---|---|---|---|---|
| | Additive | Content (wt %) | Positive electrode material | Initial capacity (mAh/g) | Capacity (mAh/g) after 200 cycles | Capacity retention rate (%) | Initial capacity (mAh/g) | Capacity (mAh/g) after 4 weeks at high temperature | Capacity retention rate (%) |
| Example 1 | 1A (+VC, PS) | 0.5 (+1) | NCMA | 2,108.1 | 1,835.2 | 87.1 | 2,109.3 | 1,809.7 | 85.8 |
| Example 2 | 1B (+VC, PS) | 0.5 (+1) | NCMA | 2,109.5 | 1,840.5 | 87.2 | 2,110.8 | 1,792.1 | 84.9 |
| Example 3 | 1A | 0.5 | NCMA | 2,112.8 | 1,781.1 | 84.3 | 2,108.7 | 1,767.1 | 83.8 |
| Example 4 | 1A (+VC, PS) | 0.5 (+1) | LCO | 2,083.9 | 1,787.9 | 85.8 | 2,091.5 | 1,725.5 | 82.5 |
| Example 5 | 2A (+VC, PS) | 0.5 (+1) | NCMA | 2,104.6 | 1,824.7 | 86.7 | 2,107.6 | 1,772.4 | 84.1 |
| Example 6 | 2B (+VC, PS) | 0.5 (+1) | NCMA | 2,102.9 | 1,816.9 | 86.4 | 2,110.3 | 1,770.5 | 83.9 |
| Comparative Example 1 | — (+VC, PS) | — (+1) | NCMA | 2,110.3 | 1,780.1 | 84.4 | 2,109.5 | 1,736.5 | 82.3 |
| Comparative Example 2 | Coumarin (+VC, PS) | 0.5 (+1) | NCMA | 2,107.6 | 1,816.8 | 86.2 | 2,106.4 | 1,754.6 | 83.3 |
| Comparative Example 3 | — | — | NCMA | 2,090.1 | 1,730.6 | 82.8 | 2,101.5 | 1,725.3 | 82.1 |
| Comparative Example 4 | — (+VC, PS) | — (+1) | LCO | 2,071.6 | 1,738.0 | 83.9 | 2,089.4 | 1,704.9 | 81.6 |

Through the results in Table 1, it can be confirmed that the batteries in Examples 1, 2, 5 and 6, which were manufactured using an electrolyte including the compound represented by Chemical Formula 1 of the present disclosure, have better high temperature life characteristics and high temperature storage characteristics than those of the battery in Comparative Example 1, which was manufactured using an electrolyte which does not include the compound represented by Chemical Formula 1, and the battery in Comparative Example 2, which was manufactured using an electrolyte including coumarin instead of the compound represented by Chemical Formula 1.

It can be seen that when the battery in Example 3 is compared with the battery in Comparative Example 3, which were manufactured using an electrolyte which does not include VC and PS, the battery in Example 3 including the compound represented by Chemical Formula 1 also has better high temperature life characteristics and high temperature storage characteristics than the battery in Comparative Example 3.

Furthermore, even when the positive electrode material was changed to LCO, by comparison between the results of Example 4 and Comparative Example 4, it can be confirmed that the high temperature life characteristics and high temperature storage characteristics can be improved by including the compound represented by Chemical Formula 1 in the electrolyte.

Since a non-aqueous electrolyte according to the present disclosure includes a compound having a structure in which a propargyl group, which reacts with active oxygen at a positive electrode by a coumarin structure to effectively suppress positive electrode decomposition and is advantageous for forming a film on the surface of a negative electrode, is bonded, a highly durable film can be formed on the electrode, the electrolyte decomposition reaction can be suppressed and the gas generation rate of a battery including a high nickel positive electrode active material can be lowered. Further, through this, it is possible to provide a lithium secondary battery whose electrochemical characteristics are ultimately improved.

What is claimed is:

1. A non-aqueous electrolyte for a lithium secondary battery, comprising: a lithium salt; an organic solvent; and a compound represented by Chemical Formula 1:

[Chemical Formula 1]

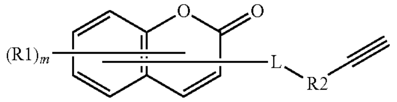

in Chemical Formula 1,

R1 is each independently an alkyl group having 1 to 10 carbon atoms,

R2 is an alkylene group having 1 to 10 carbon atoms,

L is a direct bond, —O—, —COO—, —RO—, or —R'COO—,

R and R' are each independently an alkylene group having 1 to 10 carbon atoms, and m is an integer from 0 to 5, wherein the lithium salt comprises one or more of $LiPF_6$, $LiClO_4$, $LiBF_4$, $LIN (FSQ_2)_2$, $LIN (SO_2CF_3)_2$, lithium bis (pentafluoroethanesulfonyl) imide, $LiSO_3CF_3$, $LiPO_2F_2$, lithium bis (oxalate) borate, lithium difluoro (oxalate) borate, lithium difluoro (bisoxalato) phosphate, lithium tetrafluoro (oxalate) phosphate, or lithium fluoromalonato (difluoro) borate.

2. The non-aqueous electrolyte of claim 1, wherein the compound represented by Chemical Formula 1 comprises one or more of a compound represented by Chemical Formula 1-1 or Chemical Formula 2-1:

[Chemical Formula 1-1]

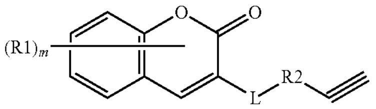

[Chemical Formula 2-1]

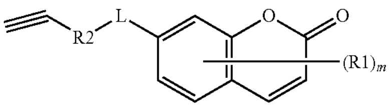

in Chemical Formula 1-1 and Chemical Formula 2-1,

R1, R2, L and m are the same as those defined in Chemical Formula 1.

3. The non-aqueous electrolyte of claim 1, wherein L of Chemical Formula 1 is —O— or —COO—.

4. The non-aqueous electrolyte of claim 1, wherein the compound represented by Chemical Formula 1 comprises one or more of a compound represented by Chemical Formula 1-2, Chemical Formula 1-3, Chemical Formula 2-2 or Chemical Formula 2-3:

[Chemical Formula 1-2]

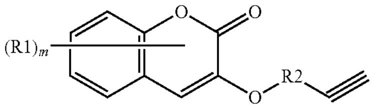

[Chemical Formula 1-3]

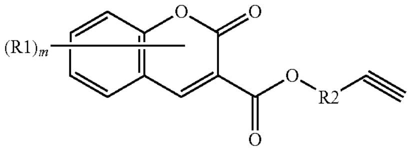

[Chemical Formula 2-2]

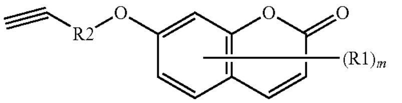

[Chemical Formula 2-3]

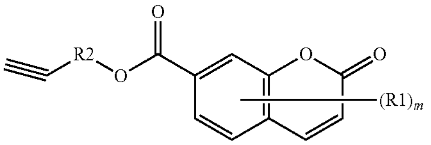

in Chemical Formula 1-2, Chemical Formula 1-3, Chemical Formula 2-1 and Chemical Formula 2-3, wherein R1, R2 and m are the same as those defined in Chemical Formula 1.

5. The non-aqueous electrolyte of claim 1, the compound represented by Chemical Formula 1 comprises one or more of a compound represented by Chemical Formula 1A, Chemical Formula 1B, Chemical Formula 2A or Chemical Formula 2B:

[Chemical Formula 1A]

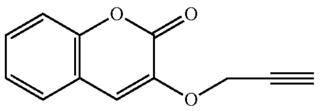

[Chemical Formula 1B]

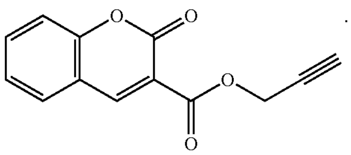

[Chemical Formula 2A]

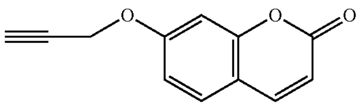

[Chemical Formula 2B]

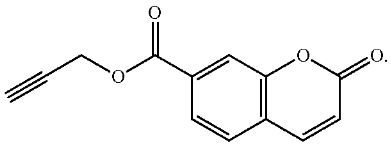

6. The non-aqueous electrolyte of claim 1, wherein a content of the compound represented by Chemical Formula 1 is 0.1 wt % to 5 wt % based on a total weight of the non-aqueous electrolyte.

7. The non-aqueous electrolyte of claim 1, wherein a content of the compound represented by Chemical Formula 1 is 0.1 wt % to 1 wt % based on a total weight of the non-aqueous electrolyte.

8. The non-aqueous electrolyte of claim 1, further comprising one or more additives selected from vinylene carbonate, vinyl ethylene carbonate, 1,3-propane sultone, ethylene sulfate, lithium difluoro oxalato borate, or lithium difluorophosphate.

9. The non-aqueous electrolyte of claim 1, wherein the organic solvent comprises a mixture of a cyclic carbonate-based solvent and a linear carbonate-based solvent.

10. A lithium secondary battery comprising:

a positive electrode comprising a positive electrode active material;

a negative electrode comprising a negative electrode active material;

a separator interposed between the positive electrode and the negative electrode; and the non-aqueous electrolyte of claim 1.

11. The lithium secondary battery of claim 10, wherein the positive electrode active material comprises a lithium composite transition metal oxide represented by Chemical Formula 3:

$Li_{1+x}(Ni_aCo_bMn_cM_d)O_2$ [Chemical Formula 3]

in Chemical Formula 3,

M is one or more selected from W, Cu, Fe, V, Cr, Ti, Zr, Zn, Al, In, Ta, Y, La, Sr, Ga, Sc, Gd, Sm, Ca, Ce, Nb, Mg, B or Mo, 1+x, a, b, c and d each are an atomic fraction of Li, Ni, Co, Mn and M, respectively, and $0 \leq x \leq 0.2$, $0.50 \leq a < 1$, $0 < b \leq 0.25$, $0 < c \leq 0.25$, $0 \leq d \leq 0.1$, and $a+b+c+d=1$.

12. The lithium secondary battery of claim 11, wherein in Chemical Formula 3, $0.80 \leq a \leq 0.95$, $0.025 \leq b \leq 0.15$, $0.025 \leq c \leq 0.15$, and $0 \leq d \leq 0.05$.

* * * * *